United States Patent [19]
Ellis

[11] Patent Number: 5,606,491
[45] Date of Patent: Feb. 25, 1997

[54] MULTIPLYING AND INVERTING CHARGE PUMP

[75] Inventor: Denis Ellis, Dooradoyle, Ireland

[73] Assignee: Analog Devices, Inc., Norwood, Mass.

[21] Appl. No.: 462,898

[22] Filed: Jun. 5, 1995

[51] Int. Cl.$^6$ ............................................. H02M 3/07
[52] U.S. Cl. ............................................. 363/60; 363/59
[58] Field of Search ............................ 307/110; 327/536; 363/59, 60

[56] References Cited

U.S. PATENT DOCUMENTS

| | | | |
|---|---|---|---|
| 4,636,930 | 1/1987 | Bingham et al. | 363/60 |
| 4,802,739 | 2/1989 | Iwamoto | 307/110 |
| 4,803,612 | 2/1989 | Skovmand | 323/284 |
| 4,807,104 | 2/1989 | Floyd et al. | 363/59 |
| 4,982,317 | 1/1991 | Mauthe | 363/60 |
| 5,029,063 | 7/1991 | Lingstaedt et al. | 363/60 |
| 5,051,881 | 9/1991 | Herold | 363/59 |
| 5,051,882 | 9/1991 | Grimm et al. | 363/60 |
| 5,095,223 | 3/1992 | Thomas | 307/110 |
| 5,111,375 | 5/1992 | Marshall | 363/60 |
| 5,159,543 | 10/1992 | Yamawaki | 307/110 |
| 5,237,209 | 8/1993 | Brewer | 307/110 |
| 5,262,934 | 11/1993 | Price | 363/60 |
| 5,306,954 | 4/1994 | Chan et al. | 307/110 |
| 5,461,557 | 10/1995 | Tamagawa | 363/60 |
| 5,463,542 | 10/1995 | Okamoto | 307/110 |
| 5,481,447 | 1/1996 | Caris et al. | 327/536 |
| 5,491,623 | 2/1996 | Jansen | 327/536 |

*Primary Examiner*—Jeffrey L. Sterrett
*Attorney, Agent, or Firm*—Koppel & Jacobs

[57] ABSTRACT

With an input voltage $V_{in}$ between first and second input terminals (24, 25), a charge pump (20) generates output voltages $+3V_{in}$ and $-3V_{in}$ at first and second output terminals (26, 28). The output voltages are generated in first and second switching phases. The charge pump includes first, second and third pump capacitors (36, 46, 56), switch networks (38, 48, 58) and reservoir capacitors (26, 28). It is particularly suited for implementation with MOS switching transistors.

30 Claims, 4 Drawing Sheets

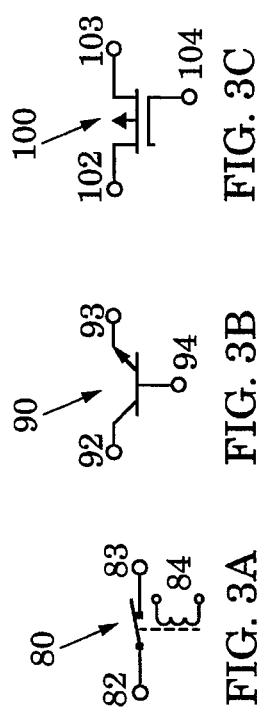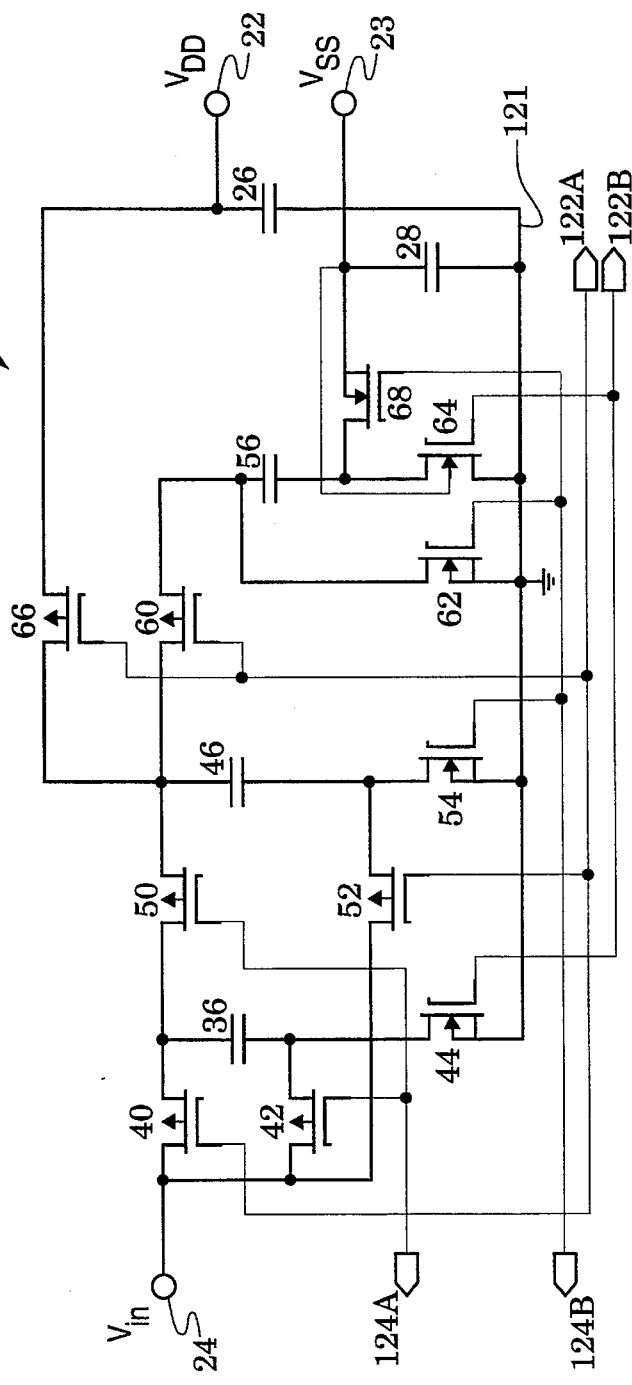

MULTIPLYING AND INVERTING CHARGE PUMP

BACKGROUND OF THE INVENTION

1. Field of the Invention

The present invention relates generally to DC/DC converters and more particularly to charge pumps.

2. Description of the Related Art

Charge pumps are DC/DC converters which are characterized by a pump capacitor and a reservoir capacitor embedded in a switch network. The reservoir capacitor provides an external load with voltage and current. The switch network is typically configured to conduct current between a supply voltage and the pump capacitor and, subsequently, to conduct charge between the pump capacitor and the reservoir capacitor.

Charge pumps are particularly suited for use in integrated circuits where space and supply voltages are limited. For example, complimentary metal oxide silicon (CMOS) circuits typically require positive and negative voltage sources ($V_{DD}$ and $V_{SS}$) but space limitations generally prohibit the availability of more than one voltage supply. Because this available input voltage often has a small amplitude $V_{in}$, a charge pump which can generate tripled and inverted output voltages, i.e., $3V_{in}$ and $-3V_{in}$, is particularly preferred. Such a charge pump also preferably operates with a simple, efficient two-phase switching operation and has a small parts count.

Although DC/DC converter configurations are available for generating doubled voltages (e.g, U.S. Pat. No. 5,029,063), inverted voltages (e.g., U.S. Pat. No. 4,982,317), doubled and inverted voltages (e.g, U.S. Pat. No. 4,807,104), multiplied and inverted voltages (e.g, U.S. Pat. No. 5,306,954) and tripled voltages (e.g., U.S. Pat. Nos. 4803,612, 5,095,223 and 5,111,375), they generally require more than two switching phases and/or a large number of parts.

SUMMARY OF THE INVENTION

The present invention is directed to a charge pump which requires a small number of parts and which generates tripled and inverted voltages from a single input voltage in a simple, two-phase switching operation.

This goal is realized with a charge pump that has three pump capacitors, two reservoir capacitors and three switch networks. The charge pump is configured to operate with a "pipelined" architecture, i.e., more than one function is performed in each switching phase.

In an embodiment that has a voltage $V_{in}$ at an input, a first switch network charges a first pump capacitor to $V_{in}$ in a first switching phase and positions the capacitor in series with the input to charge a second pump capacitor to $2V_{in}$ in a second switching phase. After receiving its charge in the second switching phase, the second pump capacitor is positioned in series with the input in the first switching phase by a second switch network. In this position, it charges a third pump capacitor to $3V_{in}$. A third switch network couples the second pump capacitor to a first reservoir capacitor and to a third pump capacitor in the first switching phase to charge both to $3V_{in}$. In the second switching phase, the third switching network inverts the third pump capacitor and couples it to a second reservoir capacitor. In this position, it charges the second reservoir capacitor to $-3V_{in}$. Portions of this embodiment may be removed to form charge pump embodiments which generate only $3V_{in}$ or $-3V_{in}$.

The invention is especially suited for use in integrated circuits, e.g., CMOS circuits, because of its low parts count and simple two-phase switching configuration. The two-phase operation permits the use of simple clock circuits and reduces power losses caused by excessive switching phases.

The novel features of the invention are set forth with particularity in the appended claims. The invention will be best understood from the following description when read in conjunction with the accompanying drawings.

BRIEF DESCRIPTION OF THE DRAWINGS

FIG. 3A is a schematic of a relay switch for implementing an embodiment of the charge pump of FIGS. 1 and 2;

FIG. 3B is a schematic of a bipolar junction transistor switch for implementing an embodiment of the charge pump of FIGS. 1 and 2;

FIG. 3C is a schematic of a MOS transistor switch for implementing an embodiment of the charge pump of FIGS. 1 and 2;

FIG. 4 is a schematic of an embodiment of the charge pump of FIGS. 1 and 2 which is implemented with MOS transistor switches;

DESCRIPTION OF THE PREFERRED EMBODIMENTS

Figure 1:
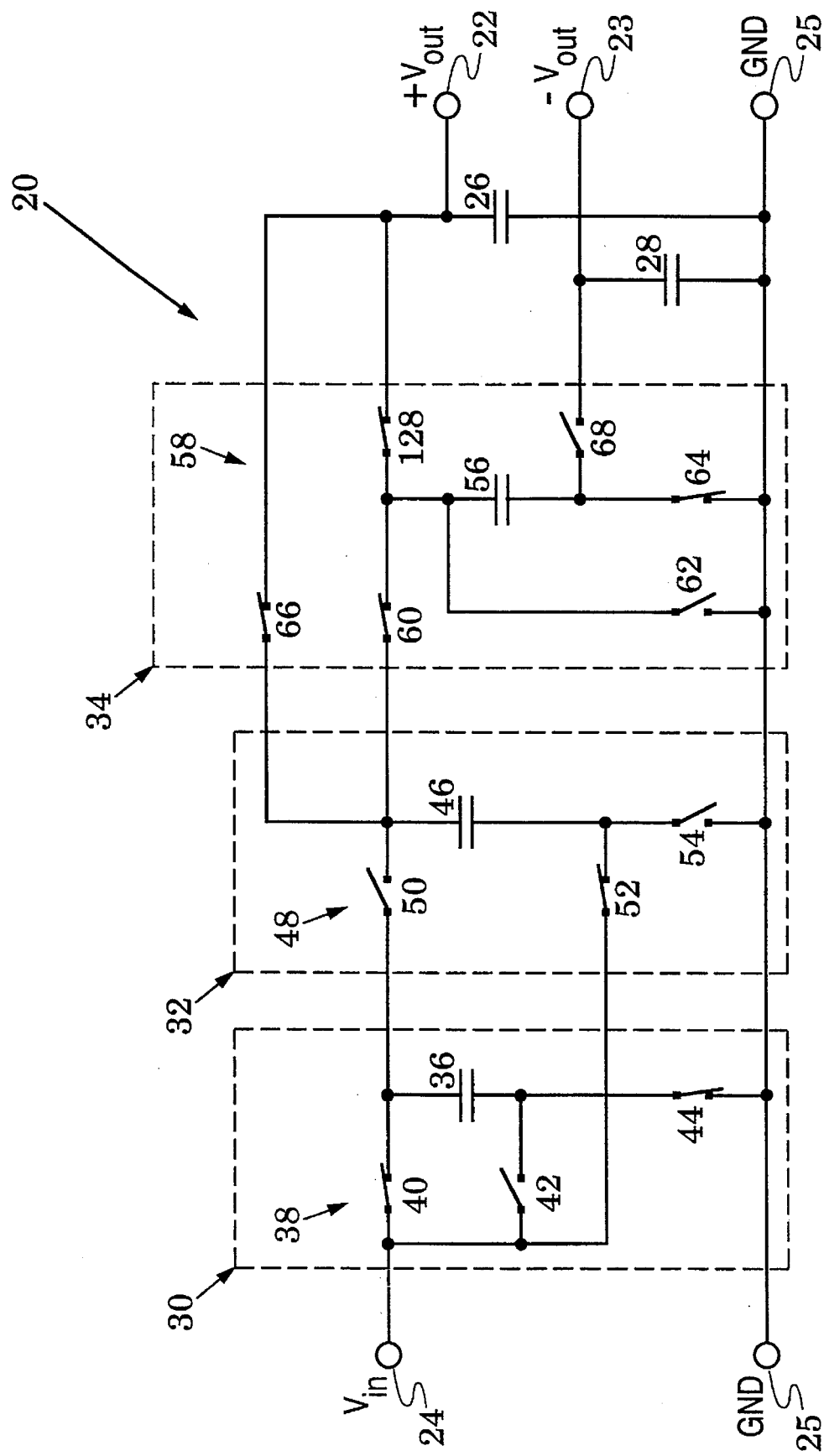
FIG. 1 is a schematic which illustrates a charge pump in accordance with the present invention in a first switching phase.
Figure 2:
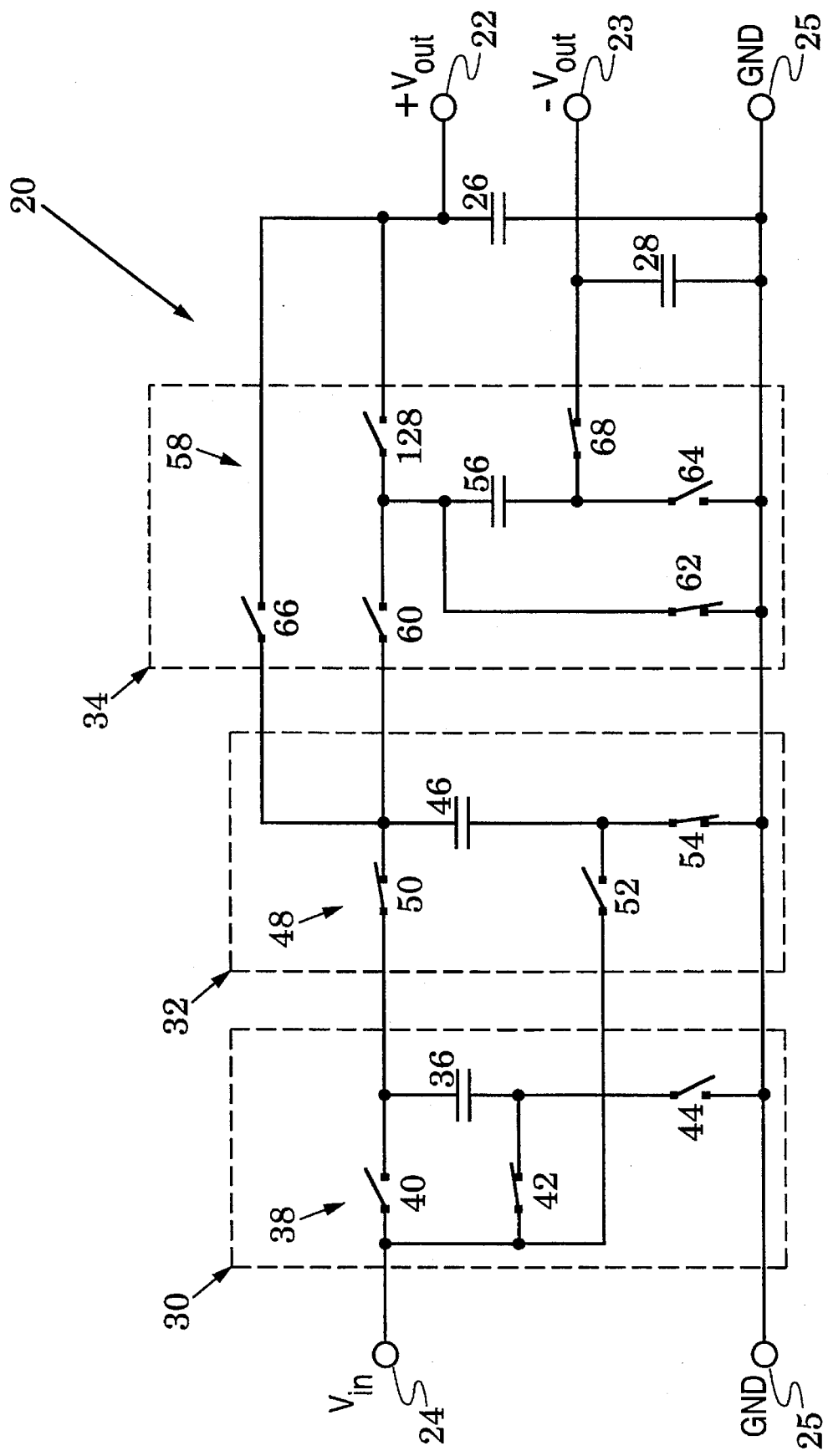
FIG. 2 is a schematic which illustrates the charge pump of FIG. 1 in a second switching phase.

A charge pump 20 in accordance with the present invention is shown in FIGS. 1 and 2. The charge pump 20 generates first and second output voltages $+V_{out}$ and $-V_{out}$ at output terminals 22 and 23. The voltage $+V_{out}$ is a tripled version of an input voltage $V_{in}$ between first and second input terminals 24 and 25, and the voltage $-V_{out}$ is a tripled and inverted version of the input voltage $V_{in}$. The voltage generation is accomplished in first and second switching phases which are respectively illustrated in FIGS. 1 and 2. The lower input terminal 25 is shown as a ground (GND) reference for both the input voltage $V_{in}$ and the output voltages $+V_{out}$ and $-V_{out}$.

A detailed description of the structure and operation of the charge pump 20 is facilitated by considering three portions 30, 32 and 34 of the charge pump which are enclosed by broken lines. In this description, the separate plates of each capacitor in FIGS. 1 and 2 are referred to as an upper plate and a lower plate.

The charge pump portion 30 includes a first pump capacitor 36 and a switching network 38. The switching network 38 is configured to couple the upper plate of the pump capacitor 36 to the upper input terminal 24 and the lower plate of the pump capacitor 36 to the lower input terminal 25 in the first switching phase. The switching network 38 is also configured to couple the lower plate of the pump capacitor 36 to the input terminal 24 in the second switching phase.

In particular, the switching network 38 includes switches 40, 42 and 44. Switch 40 is coupled between the upper plate of the capacitor 36 and the upper input terminal 24. Switch 42 is coupled between the lower plate of the pump capacitor 36 and the upper input terminal 24. Finally, switch 44 is coupled between the lower plate of the pump capacitor 36 and the lower input terminal 25.

The charge pump portion 32 includes a second pump capacitor 46 and a switching network 48. The switching network 48 is configured to couple the lower plate of the pump capacitor 46 to the upper input terminal 24 in the first switching phase. The switching network 48 is also configured to couple the upper plate of the pump capacitor 46 to the upper plate of the pump capacitor 36 and the lower plate of the pump capacitor 46 to the lower input terminal 25 in the second switching phase.

In particular, the switching network 48 includes switches 50, 52 and 54. Switch 50 is coupled between the upper plate of the pump capacitor 46 and the upper plate of the pump capacitor 36. Switch 52 is coupled between the lower plate of the pump capacitor 46 and the upper input terminal 26. Finally, the switch 54 is coupled between the lower plate of the pump capacitor 46 and the lower input terminal 25.

The charge pump portion 34 includes a third pump capacitor 56 and a switching network 58. The switching network 58 is configured to couple the upper plate of the pump capacitor 56 to the upper plate of the pump capacitor 46, the lower plate of the pump capacitor 56 to the lower input terminal 25 and the upper plate of the reservoir capacitor 26 to the upper plate of the pump capacitor 46 in the first switching phase. The switching network 58 is also configured to couple the upper plate of the pump capacitor 56 to the lower input terminal 25 and the upper plate of the reservoir capacitor 28 to the lower plate of the pump capacitor 56 in the second switching phase.

In particular, the switching network 58 includes switches 60, 62 and 64. Switch 60 is coupled between the upper plate of the pump capacitor 56 and the upper plate of the pump capacitor 46. Switch 62 is coupled between the upper plate of the pump capacitor 56 and the lower input terminal 25. Switch 64 is coupled between the lower plate of the pump capacitor 56 and the lower input terminal 25.

In addition, the switching network 58 includes output switches 66 and 68. The output switch 66 is coupled between the upper plate of the reservoir capacitor 26 and the upper plate of the pump capacitor 46. The output switch 68 is coupled between the upper plate of the reservoir capacitor 28 and the lower plate of the pump capacitor 56.

In operation, the first pump capacitor 36 is charged (from the input terminal 24) to a potential of $V_{in}$ during the first phase of FIG. 1. During the second phase of FIG. 2, the pump capacitor 36 is coupled between the input terminal 24 and the second pump capacitor 46 with the lower plate of the pump capacitor 36 coupled to the terminal 24. Thus, the potential $V_{in}$ on the pump capacitor 36 adds to the potential of the input terminal 24 and the second pump capacitor 46 is charged to a potential of $2V_{in}$ in the second switching phase.

After the pump capacitor 46 has been charged to $2V_{in}$ in the second switching phase of FIG. 2, its lower plate is coupled to the input terminal 24 and its upper plate is coupled to the upper plates of the third pump capacitor 56 and the reservoir capacitor 26 in the first switching phase of FIG. 1. The potential of $2V_{in}$ on the pump capacitor 46 then adds to the potential of the input terminal 24, and the third pump capacitor 56 and the reservoir capacitor 26 are both charged to potentials of $3V_{in}$.

After the third pump capacitor 56 is charged to $3V_{in}$ in the first phase of FIG. 1, it is coupled in the second switching phase between the lower input terminal 25 and the reservoir capacitor 28, with the lower plate of the pump capacitor 56 coupled to the upper plate of the reservoir capacitor. The negative potential on the lower plate of the pump capacitor 56 charges the reservoir capacitor 28 to a potential of $-3V_{in}$.

Therefore, the charge pump 20 generates output voltages of $3V_{in}$ and $-33V_{in}$ on the reservoir capacitors 26 and 28 by multiplying and inverting $-3V_{in}$ on the reservoir capacitors 26 and 28 by multiplying and inverting the input voltage $V_{in}$ at the input terminal 24 in the two-phase operation illustrated in FIGS. 1 and 2. The simple two-phase operation is obtained with a pipelining architecture that performs multiple functions in each phase. For example, while the first pump capacitor 36 is being charged in the first switching phase, the second pump capacitor 46 is simultaneously charging the third pump capacitor 56.

The switches of the charge pump 20 are implemented in FIGS. 1 and 2 as simple mechanical switches. Practical embodiments of the charge pump 20 are preferably implemented with switches that have first and second current terminals which are responsive to a control signal. That is, switches in which current flow between the current terminals is turned on and off in response to a control signal.

Exemplary controlled switches include a relay 80 which is shown in FIG. 3A. The relay 80 has first and second current terminals 82 and 83 which respond to current in a coil 84. Another exemplary switch is the bipolar junction transistor 90 of FIG. 3B, which has first and second current terminals 92 and 93 (collector and emitter) which are responsive to signals at a third control terminal 94 (base). Yet another exemplary switch is the metal-oxide-switch (MOS) transistor 100 of FIG. 3C, which has first and second current terminals 102 and 103 (drain and source) which are responsive to signals at a third control terminal 104 (gate).

FIG. 4 illustrates a charge pump embodiment 120 which is implemented with MOS transistor switches substituted for each of the mechanical switches of the charge pump 20. The charge pump 120 is otherwise similar to the charge pump 20 of FIGS. 1 and 2, with like elements indicated by like reference numbers (e.g., a MOS transistor 40 in FIG. 4 replaces the mechanical switch 40 of FIGS. 1 and 2). Because the charge pump 120 would typically be intended to generate voltages for a MOS circuit, the voltages at the output terminals 22 and 23 are respectively labeled $V_{DD}$ and $V_{SS}$ (i.e., drain and source voltage supplies). For clarity of illustration, the lower input terminal 25 of FIGS. 1 and 2 is replaced by a ground symbol on the lower voltage rail 121.

In particular, switches 40, 42, 50, 52, 60 and 66 are implemented as n-MOS transistors and switches 44, 54, 62, 64 and 68 are implemented as p-MOS transistors. It is assumed that the n-MOS transistors of the charge substrate. The p-wells are thus the substrate (or "backgate") of the n-MOS transistors. The backgate of n-MOS transistors 44, 54 and 62 are tied to the ground rail 121. The backgate of the n-MOS transistors 64 and 68 are tied to the most negative potential, which is the output terminal 23. The source and drain of the p-MOS transistors are deposited in the circuit substrate and their backgates are therefore inherently tied to the circuit substrate, which is connected to the most positive potential of the charge pump, i.e., $V_{DD}$.

Figure 5:
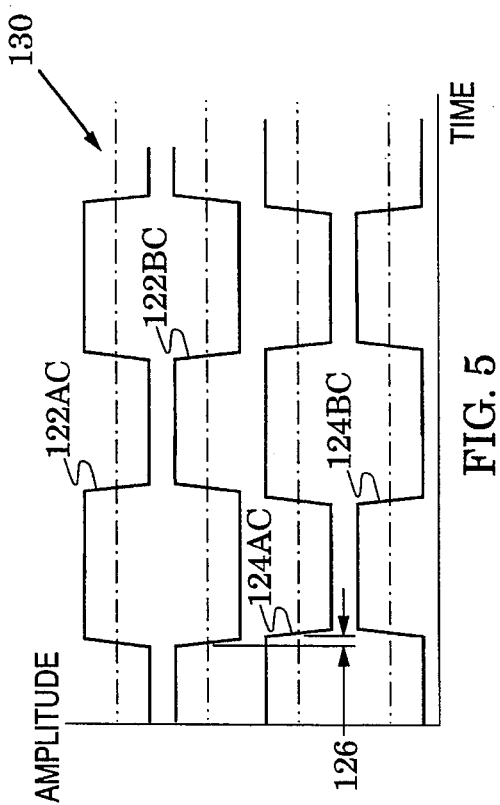
FIG. 5 is a graph of voltage waveforms that are applied to the gates of the MOS transistor switches of FIG. 4 to realize the first and second switching phases of FIGS. 1 and 2.

In accordance with the two-phase operation that was illustrated in FIGS. 1 and 2, the gates of the transistors are driven by simple two-phase clock signals. The n-MOS transistors are switched with clock signals which are applied at clock terminals 122A and 122B. The p-MOS transistors are switched with clock signals which are applied at clock terminals 124A and 124B. The clock signals are shown in the graph 130 of FIG. 5. For clarity of description, the clock signal reference numbers are the same as the clock terminals of FIG. 4 with the letter "C" added. For example, the clock signal 122AC in FIG. 5 is the signal at the terminal 122A in FIG. 4. The clock signals are shown in FIG. 5 as they might appear on an oscilloscope. The amplitudes of the two phases of each clock signal are typically balanced about ground, e.g., +/−7.5 volts.

The clock signals are preferably adapted to have "break-before-make" delay times indicated by an exemplary space 126 in FIG. 5. For example, it is preferable that the charging of pump capacitor 36 be completed in the first phase of FIG. 1 before it is switched to charge the pump capacitor 46 in the second phase of FIG. 2. Accordingly, the switches 40 and 44 are switched from their first phase positions of FIG. 1 to their second phase positions of FIG. 2 before the switches 42 and 50 are switched from their first phase positions to their second phase positions.

In the charge pump 20 of FIGS. 1 and 2, the upper plates of the reservoir capacitor 26 and the pump capacitor 56 are coupled in the first phase of FIG. 1 to the upper plate of the pump capacitor 46. In the embodiment 20, these couplings are accomplished respectively with switches 66 and 60. Other charge pump embodiments can be formed by replacing switch 66 with a switch 128 between switch 60 and the upper plate of the reservoir capacitor 26, or by a combination of the switches 66 and 128. All of these embodiments form the required coupling of the upper plates of pump capacitors 56 and 56 and reservoir capacitor 26 in switching phase 1.

Figure 6:
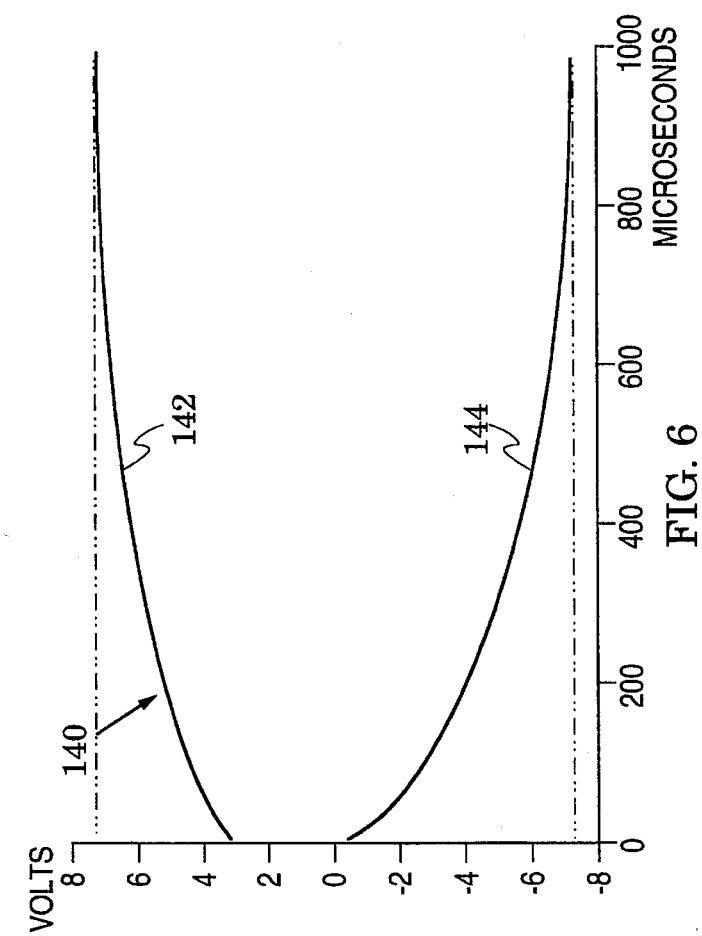
FIG. 6 is a graph which shows voltage rise times in an exemplary charge pump which was implemented with MOS transistor switches.

The embodiment 20 of FIGS. 1 and 2 was described with the potentials that are obtained under steady-state operation. When the charge pump is first turned on, all the pump and reservoir capacitors are initially without charge. A few cycles of operation are necessary to build up the steady-state potentials. This is illustrated in FIG. 6, which shows the voltage rise times in an exemplary charge pump that was implemented in accordance with the charge pump 120 of FIG. 4. This charge pump prototype had a $V_{in}$ of 2.7 volts and a clock frequency of 40 KHz, and the reservoir capacitors at the output terminals 22 and 23 were each coupled to a 750Ω load. The graph 140 of FIG. 6 shows that the voltage waveform 142 at the output terminal 22 and the voltage waveform 144 at the output terminal 23 built up to substantially +7.5 volts and −7.5 volts in approximately one millisecond.

Charge pumps in accordance with the invention are particularly suited for implementation with CMOS fabrication processes over a wide range of clock frequencies, e.g., 10–200 KHz, and output voltages. Although many applications (e.g., RS-232 receiver circuits) of the charge pump require output voltages on the order of +/−15 volts, higher output voltages can be implemented with appropriately rated CMOS processes.

Because switching the gate capacitance of MOS transistors requires power, operation efficiency is increased when the number of operating phases is reduced. Thus, the two-phase operation of the invention enhances efficiency in addition to facilitating the use of simple, space-conserving clock circuits.

Although the charge pump 20 generates voltages $3V_{in}$ and $-3V_{in}$ from an input voltage $V_{in}$, other useful embodiments of the invention can be used to generate a single voltage. For example, a charge pump which generates $3V_{in}$ can be formed by removing the reservoir capacitor 28, the third pump capacitor 56 and all of the third switch network 58 except the switch 66 from the charge pump 20. As a second example, a charge pump which generates $-3V_{in}$ can be formed by removing the reservoir capacitor 26 and the switch 66 from the charge pump 20.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A charge pump for production of first and second output voltages which are generated in first and second switching phases from an input voltage between first and second input terminals, comprising:

a first pump capacitor having first and second plates;

a first switch network configured to couple:
   a) said first pump capacitor's first plate to said first input terminal and said first pump capacitor's second plate to said second input terminal in said first switching phase, and
   b) said first pump capacitor's second plate to said first input terminal in said second switching phase;

a second pump capacitor having first and second plates;

a second switch network configured to couple:
   a) said second pump capacitor's second plate to said first input terminal in said first switching phase, and
   b) said second pump capacitor's first plate to said first pump capacitor's first plate and said second pump capacitor's second plate to said second input terminal in said second switching phase;

a third pump capacitor having first and second plates;

a first reservoir capacitor for storing said first output voltage, said first reservoir capacitor having first and second plates with said second plate coupled to said second input terminal;

a second reservoir capacitor for storing said second output voltage, said second reservoir capacitor having first and second plates with said second plate coupled to said second input terminal; and a third switch network configured to couple:
   a) said third pump capacitor's first plate to said second pump capacitor's first plate, said third pump capacitor's second plate to said second input terminal and said first reservoir capacitor's first plate to said second pump capacitor's first plate in said first switching phase, and
   b) said third pump capacitor's first plate to said second input terminal and said second reservoir capacitor's first plate to said third pump capacitor's second plate in said second switching phase.

2. The charge pump of claim 1, wherein said first, second and third switch networks each comprise a plurality of transistors having first and second current terminals which are responsive to a control terminal.

3. The charge pump of claim 1, wherein said first switch network includes:

a first switch coupled between said first pump capacitor's first plate and said first input terminal;

a second switch coupled between said first pump capacitor's second plate and said first input terminal; and a third switch coupled between said first pump capacitor's second plate and said second input terminal.

4. The charge pump of claim 3, wherein said first, second and third switches each comprise a transistor having first and second current terminals which are responsive to a control terminal.

5. The charge pump of claim 1, wherein said second switch network includes:

a first switch coupled between said second pump capacitor's first plate and said first pump capacitor's first plate;

a second switch coupled between said second pump capacitor's second plate and said first input terminal; and a third switch coupled between said second pump capacitor's second plate and said second input terminal.

6. The charge pump of claim 5, wherein said first, second and third switches each comprise a transistor having first and second current terminals which are responsive to a control terminal.

7. The charge pump of claim 1, wherein said third switch network includes:

a first switch coupled between said third pump capacitor's first plate and said second pump capacitor's first plate;

a second switch coupled between said third pump capacitor's first plate and said second input terminal; and a third switch coupled between said third pump capacitor's second plate and said second input terminal.

8. The charge pump of claim 7, wherein said first, second and third switches each comprise a transistor having first and second current terminals which are responsive to a control terminal.

9. The charge pump of claim 7, wherein said third switch network further includes:

a first output switch coupled between said first reservoir capacitor's first plate and said second pump capacitor's first plate; and a second output switch coupled between said second reservoir capacitor's first plate and said third pump capacitor's second plate.

10. The charge pump of claim 9, wherein said first and second output switches each comprise a transistor having first and second current terminals which are responsive to a control terminal.

11. The charge pump of claim 7, wherein said third switch network further includes:

a first output switch coupled between said first reservoir capacitor's first plate and said third pump capacitor's first plate; and a second output switch coupled between said second reservoir capacitor's first plate and said third pump capacitor's second plate.

12. The charge pump of claim 1, wherein said third switch network includes:

a first switch coupled between said first reservoir capacitor's first plate and said second pump capacitor's first plate;

a second switch coupled between said first reservoir capacitor's first plate and said third pump capacitor's first plate;

a third switch coupled between said third pump capacitor's first plate and said second input terminal and;

a fourth switch coupled between said third pump capacitor's second plate and said second input terminal.

13. A charge pump for production of an output voltage which is generated in first and second switching phases from an input voltage between first and second input terminals, comprising:

a first pump capacitor having first and second plates;

a first switch network configured to couple:

a) said first pump capacitor's first plate to said first input terminal and said first pump capacitor's second plate to said second input terminal in said first switching phase, and b) said first pump capacitor's second plate to said first input terminal in said second switching phase;

a second pump capacitor having first and second plates;

a second switch network configured to couple:

a) said second pump capacitor's second plate to said first input terminal in said first switching phase, and b) said second pump capacitor's first plate to said first pump capacitor's first plate and said second pump capacitor's second plate to said second input terminal in said second switching phase;

a reservoir capacitor for storing said output, voltage, said reservoir capacitor having first and second plates with said second plate coupled to said second input terminal; and an output switch configured to couple said reservoir capacitor's upper plate and said second pump capacitor's upper plate in said first switching phase.

14. The charge pump of claim 13, wherein said first switch network includes:

a first switch coupled between said first pump capacitor's first plate and said first input terminal;

a second switch coupled between said first pump capacitor's second plate and said first input terminal; and a third switch coupled between said first pump capacitor's second plate and said second input terminal.

15. The charge pump of claim 14, wherein said first, second and third switches each comprise a transistor having first and second current terminals which are responsive to a control terminal.

16. The charge pump of claim 13, wherein said second switch network includes:

a first switch coupled between said second pump capacitor's first plate and said first pump capacitor's first plate;

a second switch coupled between said second pump capacitor's second plate and said first input terminal; and a third switch coupled between said second pump capacitor's second plate and said second input terminal.

17. The charge pump of claim 16, wherein said first, second and third switches each comprise a transistor having first and second current terminals which are responsive to a control terminal.

18. A charge pump for production of an output voltage which is generated in first and second switching phases from an input voltage between first and second input terminals, comprising:

a first pump capacitor having first and second plates;

a first switch network configured to couple:

a) said first pump capacitor's first plate to said first input terminal and said first pump capacitor's second plate to said second input terminal in said first switching phase, and b) said first pump capacitor's second plate to said first input terminal in said second switching phase;

a second pump capacitor having first and second plates;

a second switch network configured to couple:
  a) said second pump capacitor's second plate to said first input terminal in said first switching phase, and
  b) said second pump capacitor's first plate to said first pump capacitor's first plate and said second pump capacitor's second plate to said second input terminal in said second switching phase;
a third pump capacitor having first and second plates;
a reservoir capacitor for storing said output voltage, said reservoir capacitor having first and second plates with said second plate coupled to said second input terminal; and
a third switch network configured to couple:
  a) said third pump capacitor's first plate to said second pump capacitor's first plate and said third pump capacitor's second plate to said second input terminal in said first switching phase, and
  b) said third pump capacitor's first plate to said second input terminal and said reservoir capacitor's first plate to said third pump capacitor's second plate in said second switching phase.

19. The charge pump of claim 18, wherein said first switch network includes:
a first switch coupled between said first pump capacitor's first plate and said first input terminal;
a second switch coupled between said first pump capacitor's second plate and said first input terminal; and
a third switch coupled between said first pump capacitor's second plate and said second input terminal.

20. The charge pump of claim. 19, wherein said first, second and third switches each comprise a transistor having first and second current terminals which are responsive to a control terminal.

21. The charge pump of claim 18, wherein said second switch network includes:
a first switch coupled between said second pump capacitor's first plate and said first pump capacitor's first plate;
a second switch coupled between said second pump capacitor's second plate and said first input terminal; and
a third switch coupled between said second pump capacitor's second plate and said second input terminal.

22. The charge pump of claim 21, wherein said first, second and third switches each comprise a transistor having first and second current terminals which are responsive to a control terminal.

23. The charge pump of claim 18, wherein said third switch network includes:
a first switch coupled between said third pump capacitor's first plate and said second pump capacitor's first plate;
a second switch coupled between said third pump capacitor's first plate and said second input terminal;
a third switch coupled between said third pump capacitor's second plate and said second input terminal; and
a fourth switch coupled between said third pump capacitor's second plate and said reservoir capacitor's first plate.

24. The charge pump of claim 23, wherein said first, second, third and fourth switches each comprise a transistor having first and second current terminals which are responsive to a control terminal.

25. A charge pump, comprising:
an input terminal;
first, second and third pump capacitors;
first and second reservoir capacitors for storing first and second output voltages;
a switching network configured during a first switching phase to charge said first pump capacitor from said input terminal, and to charge both said third pump capacitor and said first reservoir capacitor from a series connection of said input terminal and said second pump capacitor, and configured during a second switching phase to charge said second pump capacitor from a series connection of said input terminal and said first pump capacitor, and to inversely charge said second reservoir capacitor from said third pump capacitor.

26. The charge pump of claim 25, wherein said switching network comprises a plurality of transistors having first and second current terminals which are responsive to a control terminal.

27. A charge pump, comprising:
an input terminal;
first and second pump capacitors;
a reservoir capacitor for storing an output voltage;
a switching network configured during a first switching phase to charge said first pump capacitor from said input terminal, and to charge said reservoir capacitor from a series connection of said input terminal and said second pump capacitor, and configured during a second switching phase to charge said second pump capacitor from a series connection of said input terminal and said first pump capacitor.

28. The charge pump of claim 27, wherein said switching network comprises a plurality of transistors having first and second current terminals which are responsive to a control terminal.

29. The charge pump of claim 27, wherein said switching network comprises a plurality of transistors having first and second current terminals which are responsive to a control terminal.

30. A charge pump, comprising:
an input terrain
first, second and third pump capacitors;
a reservoir capacitor for storing an output voltage;
a switching network configured during a first switching phase to charge said first pump capacitor from said input terminal, and to charge said third pump capacitor from a series connection of said input terminal and said second pump capacitor, and configured during a second switching phase to charge said second pump capacitor from a series connection of said input terminal and said first pump capacitor, and to inversely charge said reservoir capacitor from said third pump capacitor.

* * * * *